No. 726,462. PATENTED APR. 28, 1903.
C. A. RICHARDSON.
HEATING STOVE.
APPLICATION FILED DEC. 13, 1902.
NO MODEL.
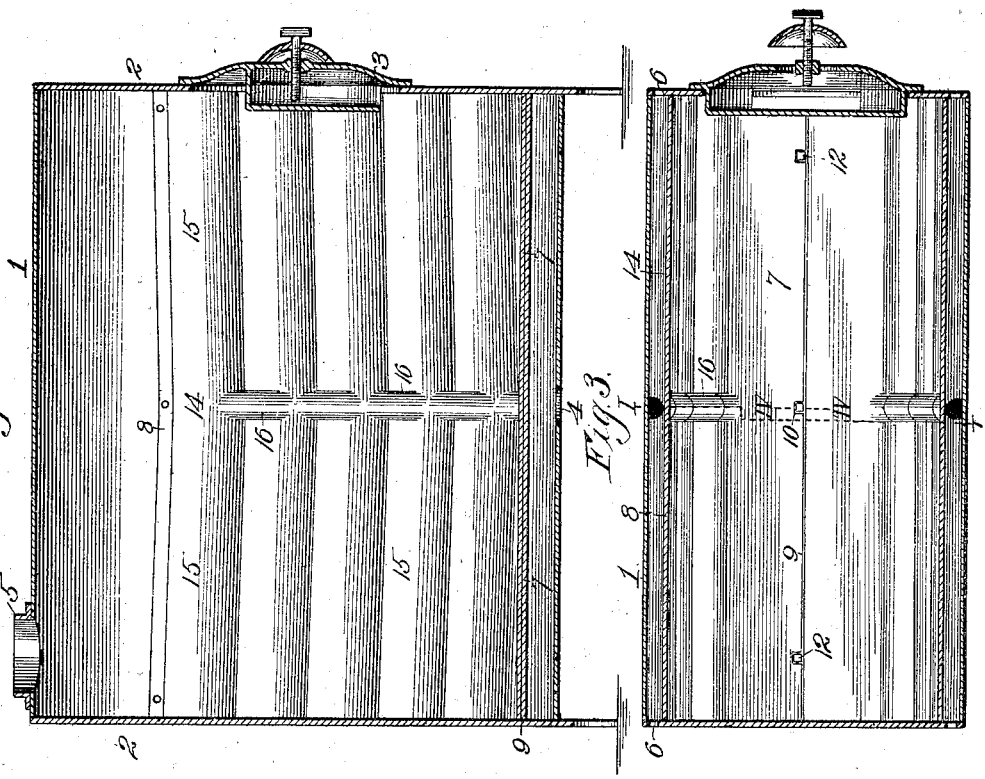
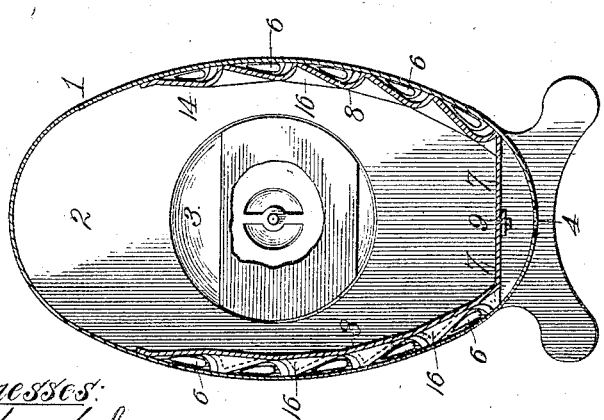
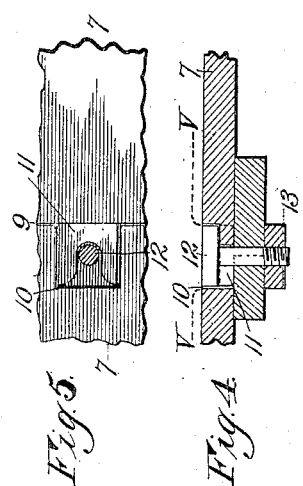
Witnesses:
Inventor:
C. A. Richardson.
By George␣␣␣␣␣␣
Atty.

UNITED STATES PATENT OFFICE.

CHARLES A. RICHARDSON, OF KANSAS CITY, MISSOURI.

HEATING-STOVE.

SPECIFICATION forming part of Letters Patent No. 726,462, dated April 28, 1903.

Application filed December 13, 1902. Serial No. 135,066. (No model.)

*To all whom it may concern:*

Be it known that I, CHARLES A. RICHARDSON, a citizen of the United States, residing at Kansas City, in the county of Jackson and State of Missouri, have invented certain new and useful Improvements in Heating-Stoves, of which the following is a specification.

My invention relates to heating-stoves, and is designed more especially as an improvement on that for which Patent No. 711,124 was granted to me October 14, 1902, my objective being a stove of the same general type that can be manufactured and sold as a low-price stove.

With this object in view the invention consists in certain novel and peculiar features of construction and organization, as hereinafter described, and in order that it may be fully understood reference is to be had to the accompanying drawings, in which—

Figure 1 represents a vertical section taken on the line I I of Fig. 3. Fig. 2 is a central vertical longitudinal section. Fig. 3 is a central horizontal section. Fig. 4 is a full-sized vertical section taken on the line IV IV of Fig. 3, and Fig. 5 is a section on the line V V of Fig. 4.

In the said drawings, 1 designates the shell or body of the stove, the same being preferably of elliptical form in cross-section.

2 designates the heads or ends of the stove, the one having the feed-opening being equipped with a feed-door 3, preferably of circular form, and adapted to be equipped with the usual or any preferred type of draft devices.

In the bottom of the shell or body and near each end, by preference, is a cold-air intake-opening 4, and at its top and rear end is the usual collar 5, to which the stovepipe (not shown) is secured, and in each head or end contiguous to and parallel with the side margins thereof are a series of outlet-openings 6 of elliptic or any preferred configuration.

The lining of the stove is preferably in two sections, each consisting of a horizontal or base portion 7 and a substantially upright or side portion 8, the latter curving to correspond with and fit snugly against the inner sides of the shell or body and the former bridging the bottom, so as to form below a chamber with which communicates the opening or openings 4. The inner edges of portions 7 are step-jointed together, as at 9, and that provided with a step is also formed with a series of rectangular recesses 10 to receive snugly the bifurcated lugs 11, projecting from the other section, and the rectangular heads of bolts 12, said bolts extending down through said step and engaged by clamping-nuts 13, secure the two sections rigidly together. By this relation of parts the upper surface of the base portions of the lining is practically smooth, so that it shall not impede or interfere with the free manipulation of a shovel in removing ashes from the stove. Each side portion is formed of a series of superposed flutes, which in cross-section approximate in form the letter J, as at 14, with the stem of the letter disposed uppermost and sloping downwardly and inwardly of the stove, to the end that the side portions of the lining shall not form a convenient support for fine ashes, and thus in a degree insulate the hollow portion of the lining-flutes from the heat of the stove. As stated, these side portions of the lining fit snugly against the side walls of the shell or body and in conjunction therewith form a series of longitudinal passages, and in order that such passages may facilitate rather than retard the circulation of air the flutes are so bent at their middle that they diverge slightly upward toward each end, as at 15, their ends registering with the outlet-opening 6 in the ends or heads of the stove hereinbefore mentioned, and as a further aid toward proper circulation said longitudinal passages and the chamber below the base or horizontal portions of the lining are connected together midway their length, preferably by the grooved portions 16.

When the stove is in operation, the heat raises the temperature of the lining, which is by preference of cast-iron, as usual, to a high degree of heat, and thus raises the temperature of the air in the longitudinal passages, this air eventually passing out through the opposite ends of the stove into the room and displacing an equal volume of cold air, which descends to the floor and passes up through the intake-opening 4, then successively upward into the longitudinal passages, a certain proportion of it of course being deflected through the ends of each passage.

The hook portion of each J-shaped flute, in conjunction with the stem portion of the flute next below, provides a chamber for concentrating the heat against the lining, so as to get the best results possible from the fuel in raising the temperature of the air in the longitudinal passages, the circulating air in said passages at the same time reducing the chances of the lining burning out, and thereby insuring for it a longer period of service.

It will thus be seen that by means of a single lining I produce, in effect, a combined stove and heating-drum, and thereby obtain a much greater percentage of heat than is obtained by a stove without such passages, this result being accomplished, furthermore, by the use of a lining which is cheap as compared to the lining of my former patent hereinbefore referred to.

It will be apparent, of course, that there is room for modification as regards its form, detail construction, and the proportion of its parts and that to such changes I am entitled and that the stove as a whole combines maximum efficiency, with minimum cost of manufacture, and possesses the very desirable features of simplicity and durability.

Having thus described the invention, what I claim as new, and desire to secure by Letters Patent, is—

1. A heating-stove provided with holes in its ends or heads, and having a fluted lining fitting against the shell or body portion, and consisting of a lower portion bridging the bottom and side portions fitting snugly against the sides of the shell or body, with its hollow side out to form longitudinal passages communicating with the holes in the stove ends or heads; said lining having grooves at its outer or hollow side connecting said passages together and to the space below the lower or bottom portion.

2. A heating-stove having holes in its ends or heads, and provided with a fluted lining fitting against the shell or body portion, and consisting of a lower portion bridging the bottom, and side portions fitting snugly against the sides of the shell or body, with its hollow side out to form longitudinal passages communicating with the holes in the ends or heads of the stove, said fluted portions of the lining being substantially J shape in cross-section with the stem portion sloping downwardly and inwardly of the stove, and at their outer or hollow sides connected together and to the space below said lower portion by grooved portions.

3. A heating-stove having holes in its ends or heads, and provided with a lining, consisting of two sections, each of which comprises a lower portion and a fluted side portion, the latter fitting against a side of the shell or body and forming in conjunction therewith longitudinal passages registering with the holes in the ends or heads, the lower portions having a step relation with each other at their inner edges, the stepped portion having recesses in its upper side and the companion portion provided with bifurcated lugs engaging said recesses; bolts extending through said lugs and stepped portions and having their heads occupying said recesses, and clamping-nuts engaging the lower ends of said bolts.

In testimony whereof I affix my signature in the presence of two witnesses.

CHARLES A. RICHARDSON.

Witnesses:
A. McArthur,
G. Y. Thorpe.